United States Patent [19]

Rauser

[11] 4,295,164

[45] Oct. 13, 1981

[54] CIRCUIT FOR IMPROVING PICTURE QUALITY IN A TELEVISION RECEIVER

[75] Inventor: Horst Rauser, Hemmingen, Fed. Rep. of Germany

[73] Assignee: Licentia Patent-Verwaltungs GmbH, Fed. Rep. of Germany

[21] Appl. No.: 121,698

[22] Filed: Feb. 15, 1980

[30] Foreign Application Priority Data

Feb. 21, 1979 [DE]  Fed. Rep. of Germany ....... 2906649

[51] Int. Cl.³ .............................................. H04N 5/63
[52] U.S. Cl. .................................... 358/166; 358/242
[58] Field of Search ............... 358/160, 162, 163, 166, 358/31, 37, 242

[56] References Cited

U.S. PATENT DOCUMENTS

| | | | |
|---|---|---|---|
| 3,641,268 | 2/1972 | Beck | 358/166 |
| 3,839,598 | 10/1974 | Okada | 358/162 |
| 3,980,813 | 9/1976 | Shinkai | 358/162 |
| 4,072,984 | 2/1978 | Kaiser | 358/31 |
| 4,080,628 | 3/1978 | Jirka | 358/166 |
| 4,183,064 | 1/1980 | Sahara et al. | 358/166 |

OTHER PUBLICATIONS

A New Technique for Improving the Sharpness of TV Pictures, by C. Goldmark, Oct. 1951, Journal of the Smpte, vol. 57, pp. 382–397.

Description of the CBS Crispening Circuit, May 8, 1950.

Primary Examiner—Robert L. Richardson
Assistant Examiner—Tommy P. Chin
Attorney, Agent, or Firm—McGlew and Tuttle

[57] ABSTRACT

A circuit for improving picture quality in a television receiver adapted to receive video signals, with light picture areas corresponding to a high video signal level bounded by inclined rising and falling edges comprising, circuit elements for producing a differentiated video signal from the received video signal having positive and negative peaks at the inclined rising and falling edges of the received video signal respectively, circuit elements for inverting the differentiated video signal and clipping the negative pulse thereof, and circuit elements for adding the inverted and clipped differentiated signal to the received video signal whereby the falling edge of the received video signal is enhanced and the picture quality is improved.

2 Claims, 3 Drawing Figures

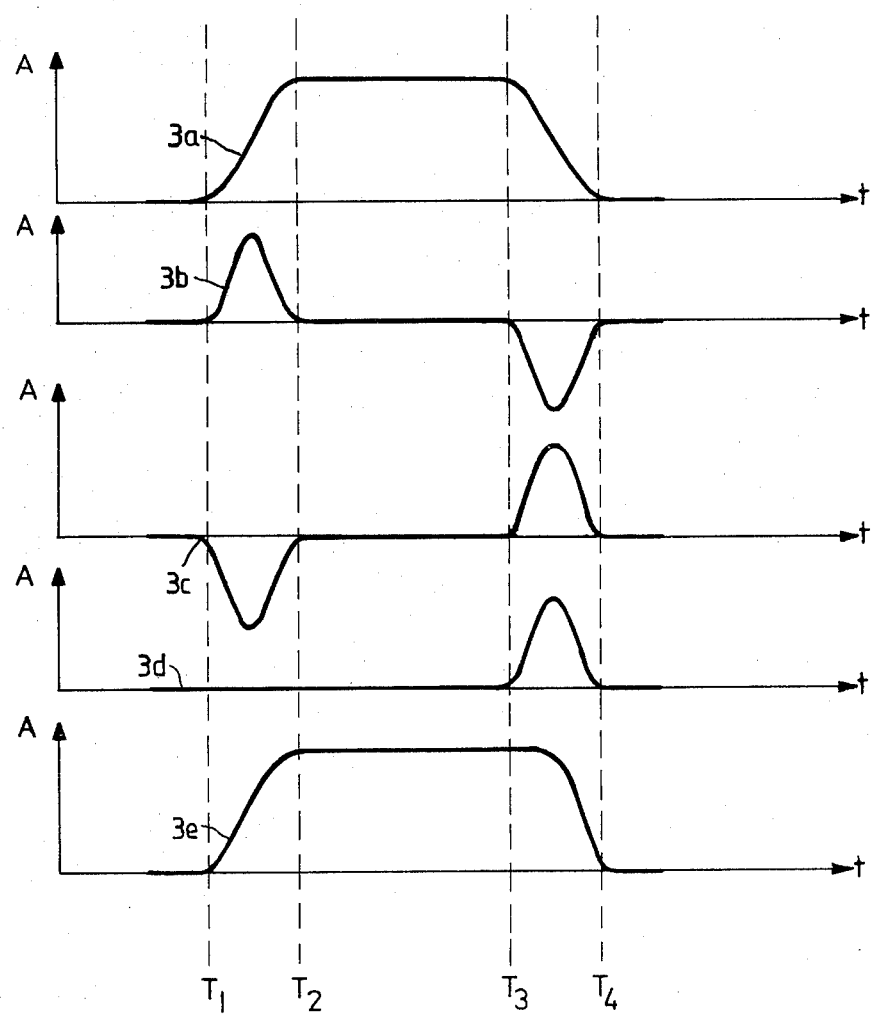

CIRCUIT FOR IMPROVING PICTURE QUALITY IN A TELEVISION RECEIVER

FIELD AND BACKGROUND OF THE INVENTION

The present invention relates in general to circuits for improving the quality of a television picture and, in particular to, a new and useful circuit for improving picture quality in a television receiver where light picture areas correspond to a high video signal level bounded by inclined rising and falling edges and where a pulse is added to the falling edge of the high video signal level.

As is known, the video signal obtained from the IF-stage is transmitted in a television receiver directly or over filters to the chroma-stages or the electron beam tube. The video signal originally supplied by a television station has a band width of about 5 MHz. Due to errors in the receiving station and band limitations in the transmission of the signal or filter with limited pass range, it is not possible in practice to reproduce the entire originally emitted frequency spectrum on the picture screen. The result is that steep black and white transitions are blurred or fine structures can no longer be recognized on the screen.

Various methods have been suggested in the literature to increase the picture quality on the picture screen by which the picture definition can be more or less improved. In the so-called aperture compensation method, the intensity of the electron beam is first reduced in those parts of the picture where the brightness passes from a low to a high level or vice versa by adding a twice differentiated video signal to the video signal, and then increasing it again or vice versa. Peak levels in the brightness of the compensated video signal may lead to beam currents which are substantially increased, compared to the beam currents existing in the original video signal, so that the picture elements on the picture screen increase again and the method does not lead to the desired result.

In order to eliminate this drawback, DOS No. 23 47 573 suggests a method for producing rapid brightness variations on a picture screen, where a control signal characterizing the amplitude value of the video signal is derived from the video signal, which is used to vary the horizontal deflection velocity. In this method the video signal is differentiated twice, and the deflection velocity of the electron beam is modulated with this signal in the line direction by a special deflection coil. In order to effect the modulation of the deflection velocity at the same point where the video signal jumps, it is necessary to delay the video signal by a delay line for a certain time interval. Since the video signal is fed in this method uninfluenced to the cathode, the deflection velocity modulation method does not lead to a variation of the size of the luminous spot, so that this method offers certain advantages over the aperture compensation method. A disadvantage of this method is that light or white areas of the reproduced picture are narrowed in the line direction, so that the information is falsified.

DOS No. 27 53 196 describes a method which uses the deflection velocity modulation method in combination with a waveform circuit. It starts from the known velocity modulation method, but it avoids the disadvantage that the white portions are narrowed in the video signal. The waveform circuit used contains an OR-gate circuit which receives the uninfluenced video signal and a video signal delayed over a delay line, so that a widened video signal appears at the output of the waveform circuit. In addition, the deflection velocity modulation method is used, so that a picture appears on the picture screen whose white portions are reproduced in the correct width, but the picture has still a greater definition. This method required a delay arrangement in the waveform circuit.

SUMMARY OF THE INVENTION

The object of the present invention is to provide a circuit which increases picture definition of a reproduced video signal, leaves the width of the reproduced white and black portions unchanged, and is simple in design without needing a delay arrangement.

The circuit of the invention requires no delay arrangement and still has the effect that the picture appears much sharper without any loss of information.

Accordingly, an object of the present invention is to provide a circuit for improving picture quality in a television receiver adapted to receive video signals, with light picture areas corresponding to a high video signal level bounded by inclined rising and falling edges comprising, means for forming a differentiated video signal from the received video signal, and means for adding the differentiated video signal to the falling edge of the received video signal in phase opposition to the received video signal. A further object of the present invention is to utilize pulse clipper means in the circuit for rendering the differentiated video signal unidirectional.

A still further object of the present invention is to provide a circuit for improving picture quality in a television receiver wherein the means for adding the differentiated video signal to the falling edge of the received video signal in phase opposition to the received video signal is adjustable.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 3 is a pulse diagram showing various waveforms of the waveform circuit in a light jump.

DESCRIPTION OF THE PREFERRED EMBODIMENT

Figure 1:
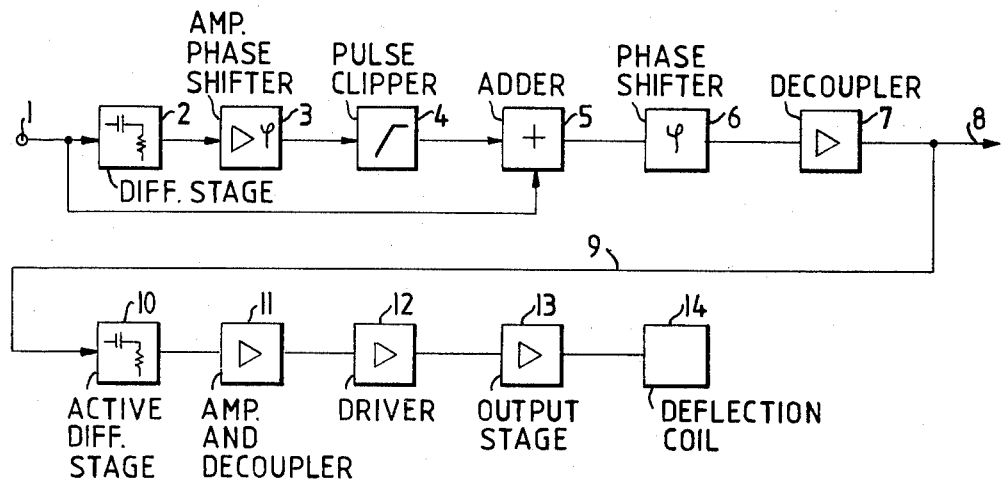
FIG. 1 is a block circuit diagram of the invention.

Turning to the drawings in particular, the invention embodied therein, in FIG. 1 comprises, a circuit for improving picture quality in a television receiver adapted to receive a video signal through a terminal 1 comprising circuit means 2, 3 and 4, for producing a differentiated video signal from the received video signal and means 5 for adding the differentiated video signal to a falling edge of a high video signal level of the received video signal in phase opposition thereto.

FIG. 1 shows terminal 1 of the IF-output, that is, the video signal is provided at this terminal. From here the signal leads to a differentiating stage 2, then to an amplifier and phase shifter 3, and then over a pulse clipper 4 to an adder 5. The video signal applied to terminal 1 is also fed directly to the input of adder 5. From adder 5, the video signal arrives over a phase shifter 6 and decoupler stage 7, to the two terminals 8 and 9. The chroma units are connected to terminal 8. The video signal is tapped from terminal 9 and fed to the velocity modulation circuit. The modulation circuit consists of a series connection of an active defferentiating stage 10, an amplifier and decoupler stage 11, a driver 12, an output stage 13, and a deflection coil 14, which is arranged on the rear portion of the picture tube, in addition to the deflection coils provided for the normal picture and line deflection.

Figure 2:
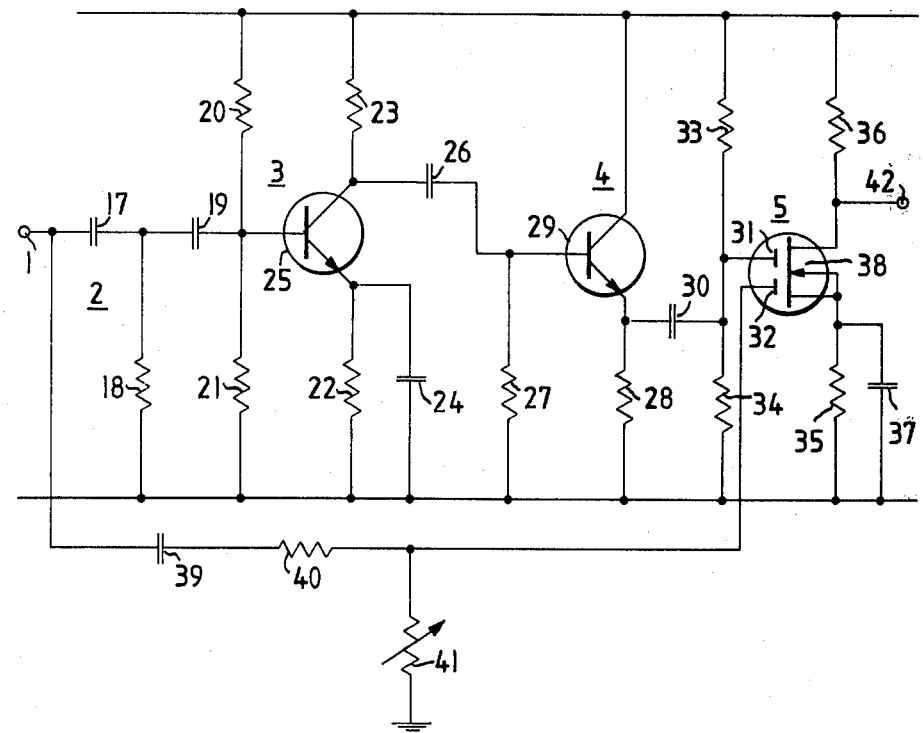
FIG. 2 is a detailed schematic circuit diagram of the waveform circuit used in accordance with the invention.

FIG. 2 shows a detailed circuit diagram of the waveform circuit. A decoupled video signal is applied to terminal 1 which is free of the color subcarrier. The signal is then fed to differentiating stage 2, which consists of CR- combination 17,18. This differentiated signal is fed over a coupling capacitor 19 to an amplifier and phase shifter 3 with resistors 20 to 23, capacitor 24 and transistor 25. From the collector of transistor 25, the differentiated video signal arrives over a coupling capacitor 26 at the pulse clipper 4 consisting of resistors 27,28 and transistors 29. This arrangement of the pulse clipper ensures that only positively directed pulses, which are formed by differentiation and phase shifting on steep amplitude jumps of the video signal, can arrive from the emitter of transistor 29 over coupling member 30 at gate 31 of the dual gate MOS-FE-transistor 38 forming the adder, in addition to resistors 34, 35, 36, 37 and capacitor 37. The video signal taken directly from terminal 1 arrives at the second gate 32 of transistor 38 over a decoupling capacitor 39 and the adjustable voltage divider consisting of resistors 40 and 41. The added video signal can then be taken from terminal 42 of transistor 38 and be fed over an amplifier and decoupling stage to the chroma-units and the velocity modulation circuit respectively.

In FIG. 3 curve 3a shows the amplitude course of the video signal at terminal 1, in a brief appearance of a bright pulse. At the time T1, the amplitude of the video signal rises slowly until it has attained its maximum value at T2. From the time T3, the signal drops again until the time T4. If a video signal according to curve 3a is applied to terminal 1 of the waveform circuit, we obtain, after differentiating stage 2, an amplitude course as represented in curve 3b. The rising course of the video signal from T1 to T2 and the falling course from T3 to T4, as shown in curve 3a, yield, in curve 3b a positive value from T1 to T2 and a negative value from T3 to T4. The differentiated signal according to curve 3b is reversed in the amplifier and phase reversal stage 3, so that a signal according to curve 3c appears. Due to pulse clipper 4, only the positive signals are transmitted to gate 31 of transistor 38 (curve 3d). By adding the signal according to curve 3d and the video signal according to curve 3a in adder 5, there is obtained a signal whose course is shown in curve 3e. Up to the time T3 the signal taken from adder 5 is identical with the signal according to curve 3a. Due to the fact that a pulse according to curve 3d has been added on the falling edge of the video signal to the original video signal, a signal is obtained on the falling edge of the signal taken from terminal 8 or 9, at which the high amplitude value continues a moment after the time T3. At the time T4 the video signal has again arrived at the value as shown in curve 3a. The video signal is thus widened and steeper on the failing edge.

The above described widening of the video signal only on the falling edge according to curve 3e is therefore of advantage and sufficient, because tests have shown that the above mentioned narrowing of the video signal by the modulation of the horizontal deflection velocity on the falling edge of T3-T4 is greater than that on the rising edge T1-T2. The narrowing of the white-pulse by the additional velocity modulation by means of deflection coil 14 is thus compensated by the widening of the pulse according to curve 3e. A vertical white bar with the correct width of the original video signal then appears on the picture screen but with greater sharpness at the edges. The increase in definition is due to the modulation of the deflection velocity.

It is advisable to suppress the color subcarrier ahead of the circuit for correcting the picture definition for the following reasons: if the color subcarrier exists on terminal 1 in FIG. 1, the unchanged color subcarrier and the differentiated phase-shifted color subcarrier would be added in adder 5. Due to the PAL-switching, the color subcarriers would be alternately added and subtracted in adder 5 from line to line. This would result in variations of the luminance signal in opposite direction alternating from line to line, so that an annoying visible moire would appear in the picture at a brightness jump.

While a specific embodiment of the invention has been shown and described in detail to illustrate the application of the principles of the invention, it will be understood that the invention may be embodied otherwise without departing from such principles.

What is claimed is:

1. A circuit for improving picture quality in a television receiver adapted to receive video signals, with light picture areas corresponding to a high video signal level bounded by inclined rising and falling edges, comprising, means for forming a differentiated video signal from the received video signal, means for adding the differentiated video signal to the falling edge of the received video signal in phase opposition to the received video signal, a terminal for receiving the video signal, a differentiation stage including said means for forming a differentiated video signal connected to said terminal for forming respective positive and negative pulses corresponding to the inclined rising and falling edges of the high video signal level, amplifier and phase shifter means connected to said differentiation stage for inverting said pulses, phase clipper means connected to said amplification and phase shifter means for clipping the negative pulse, and adder means including said means for adding connected to said pulse clipper means and to said terminal for adding the differentiated, inverted and clipped video signal from said pulse clipper means only to the falling edge of the received video signal from said terminal.

2. A circuit for improving picture quality in a television receiver according to claim 1 further including a phase shifter connected to said adder means, a decoupler connected to said phase shifter, said decoupler adapted to be connected to a chroma unit of the television receiver, said decoupler being connected to a velocity modulation circuit which is connected to a deflection coil of the television receiver.

* * * * *